July 6, 1943.                F. R. McFARLAND                2,323,340
                              MOTOR VEHICLE
                            Filed Nov. 8, 1941            2 Sheets-Sheet 1

INVENTOR.
Forest R. McFarland
BY
Tibbetts & Hart
Attorneys

July 6, 1943.    F. R. McFARLAND    2,323,340
MOTOR VEHICLE
Filed Nov. 8, 1941    2 Sheets-Sheet 2

INVENTOR.
Forest R. McFarland
BY
Tibbetts & Hart
Attorneys

Patented July 6, 1943

2,323,340

UNITED STATES PATENT OFFICE 2,323,340

MOTOR VEHICLE

Forest R. McFarland, Huntington Woods, Mich., assignor to Packard Motor Car Company, Detroit, Mich., a corporation of Michigan Application November 8, 1941, Serial No. 418,289

8 Claims. (Cl. 74—290)

This invention relates to transmissions and more particularly to transmissions of the type shown in Patent No. 2,243,111, issued to me May 27, 1941.

In this patent, overdrive to the tail shaft is established through planetary gearing when the sun gear is held stationary by a pawl. There is a coupling member connecting the planetary gearing ring gear with the tail shaft and this coupling member is shiftable to engage a member for positively connecting the tail shaft with the driven shaft. The coupling member is controlled by a fork that is fixed to a shiftable rod and operated by manually actuated mechanism or by mechanism actuated by the change speed gearing when shifted into reverse drive. There is an interlock operating between the rod carrying the fork and the sun gear holding pawl that serves to lock the pawl out of sun gear holding position when the coupling member is in positive driving relation and to lock the rod so that the coupling member can not be shifted to positive driving relation when the sun gear is held by the pawl.

It has been proposed to revise the construction in the above mentioned patent by making the fork slidable on its rod and by providing a spring coupling between the fork and the mechanism operated by the change speed gearing when shifted to reverse drive. This revision has been suggested to provide a softer positive clutching engagement of the coupling member to establish positive drive. With such construction it has been found possible to establish reverse driving relation while the sun gear is held stationary by the pawl thereby causing brakeage due to the coupling member being driven at different speeds by the drive shaft and the planetary gearing.

An object of this invention is to provide mechanism of the character referred to in which it is impossible to engage more than one driving arrangement.

Another object of this invention is to provide a transmission mechanism, of the character referred to, which retains the advantage of a spring loaded actuation of the coupling member to establish direct positive drive and permits only one driving train to be engaged at a time.

Another object of the invention is to provide a coupling shifter arrangement for establishing direct or modified drive in which the reverse gear is utilized to engage the coupling member for positive direct drive through a loaded spring and in which manually operable means can directly and positively engage the coupling means.

Other objects of the invention will appear from the following description taken in connection with the drawings, which form a part of this specification, in which.

Figure 1:
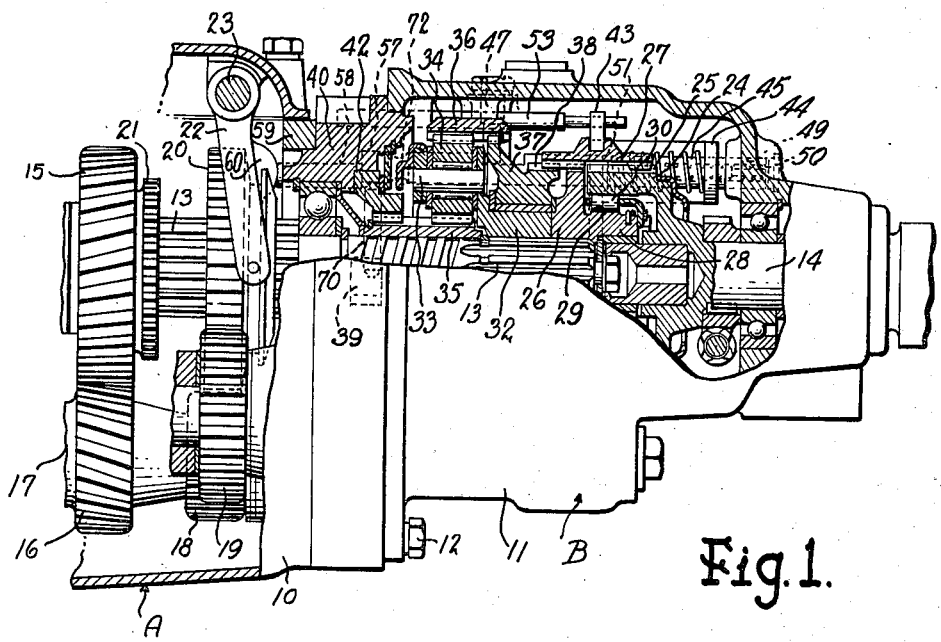
Fig. 1 is a side elevational view, partly broken away, of a transmission incorporating the invention.
Figure 2:
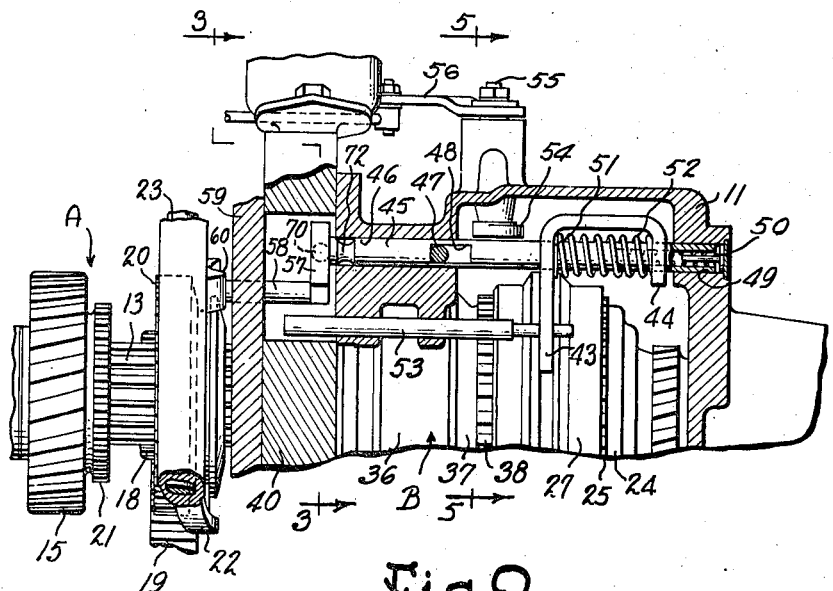
Fig. 2 is a sectional view of the transmission taken on line 2—2 of Fig. 3.
Figure 3:
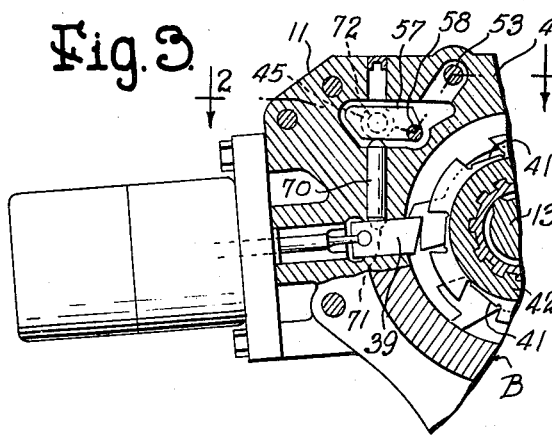
Fig. 3 is another sectional view of the transmission taken on line 3—3 of Fig. 2.
Figure 4:
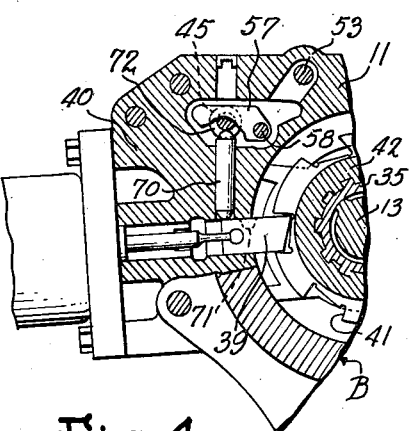
Fig. 4 is a view similar to Fig. 3 with the interlock mechanism in a different relation.
Figure 5:
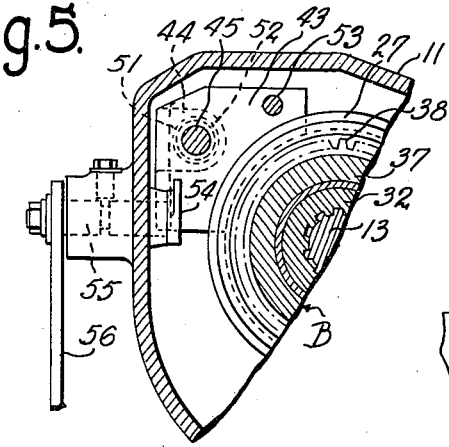
Fig. 5 is another sectional view of the transmission taken on line 5—5 of Fig. 2.

The transmission illustrated in the drawings consists generally of a change speed driving section A and a drive modifying rear section B. The change speed driving section is conventional and is housed in a casing 10. A casing 11, for the drive modifying section, is secured to casing 10 by bolts 12. Drive shaft 13 extends through casing 10 into casing 11 and tail shaft 14 extends into casing 11 and is aligned with shaft 13.

Mechanism is provided for selectively driving the drive shaft in a plurality of forward speeds or in reverse. Gear 15 is loosely mounted on shaft 13 and meshes with a driving gear 16 on the power operated lay shaft 17. Another gear 18 on the lay shaft meshes with a reverse idler gear 19 suitably mounted in casing 10. A gear and clutch member 20 is splined on shaft 13 and is axially shiftable to selectively engage clutch teeth 21 on gear 15 or to mesh with the reverse idler gear. The gear and clutch member can be shifted axially by arms 22 mounted on shaft 23 and can be actuated by manually operable mechanism (not shown).

The tail shaft is formed with an enlarged forward flanged end portion 24 having external teeth 25. Provision is made for establishing a two-way or positive drive from the drive shaft to the tail shaft through means of a driving member 26 fixed on the drive shaft and coupling means in the form of a sleeve clutch 27 engaging the teeth 25 on the tail shaft end portion and engageable with the driving member. Provision is also made for establishing a one-way overrunning drive from the drive shaft to the tail shaft through means of a hub 28 extending from the driving member having cam surfaces 29 and rollers 30 arranged between these surfaces and the interior surface of the flanged end portion of the tail shaft. When the sleeve clutch is shifted to engage the driving member positive two-way drive will be established between the drive shaft and the tail shaft. When the two-way positive drive is released, the overrunning clutch can automatically establish a one-way drive from the drive shaft to the tail shaft.

Provision is also made for establishing a modified drive from the drive shaft to the tail shaft and consists of planetary gearing for driving the tail shaft faster than the drive shaft. A carrier hub 32 is fixed on the drive shaft, in advance of the driving member 26, and supports pins 33 on which planet gears 34 are rotatably mounted. The planet gears mesh with sun gear 35, loosely mounted on the drive shaft, and a ring gear structure consisting of splined together sections 36 and 37. Section 36 of the ring gear structure has internal teeth engaged by the planet gears and section 37 has external teeth 38 engaged by the clutch sleeve 27.

The ring gear structure and the tail shaft are connected by the clutch sleeve so that they rotate together under all operating conditions. When the sun gear is held stationary, the drive will flow from the drive shaft and through the planetary gearing to the clutch sleeve but when the sun gear is released, the planetary gearing will idle. The sun gear can be braked by suitable means, such as a pawl 39, that is slidably mounted in a casing wall 40 and can be operated to engage in recesses 41 in a flange 42 splined on the forward end of the sun gear. A specific mechanism for controlling the pawl can be found in my patent, previously identified.

As the tail shaft can be driven from the drive shaft at two speeds, it is necessary that the sun gear is free when the positive drive is established and that the positive drive is disconnected when the sun gear is braked. The sleeve clutch is engaged by a shift fork 43 having an end portion 44 formed as a loop. The clutch and its fork are under the control of mechanism that includes a rod 45 extending through the fork and its end portion and mounted to slide in a recess 46 in the casing 11. The rod is limited in its axial movement by a pin 47 suitably fixed to the casing and projecting into a slot 48 in the rod. The slot is substantially the same diameter as the pin so that rotative movement of the rod is substantially prohibited. The pin thus acts as a guide and stop means for the rod. The rear end of the rod is mounted in a recess 49 in casing 11 and is recessed to receive a coil spring 50 acting to urge the rod forwardly.

The rod is grooved to take an annular ring 51 which serves as an abutment for one end of a coil spring 52. The other end of this spring bears against the end portion 44 of the shift fork. Guide means 53, in the form of a two diameter rod, is fixed in casing 11 and extends through an opening in the shift fork.

The two-way drive can be obtained by the operation of either one of two mechanisms. A cam 54 is fixed on shaft 55 extending through the casing which has an arm 56 fixed thereto that can be rocked by manual operation through suitable mechanism (not shown). This cam is arranged so that it can engage the shift fork to force it rearwardly and thereby engage the sleeve clutch 27 with the driving member 26. The forward end of this shift rod has a flange 57 that aligns with an actuator pin 58 slidably mounted in wall 59 at the rear of casing 10. This actuator pin is arranged to lie in the path of the shift mechanism for effecting reverse drive and the arms 22 carry an abutment member 60 for engaging this pin. Spring 50 normally acts to hold the pin 58 engaged against abutment member 60. Then the rod 45 is shifted rearwardly by the reverse drive shift mechanism, as shown in Fig. 1, the rod abutment 51 creates a force against spring 52 that is transferred to the end 44 of the shifter fork to engage the sleeve clutch 27 with the teeth of the driving member 26 provided there is no interference. If there is tooth interference, the spring 52 is cocked and will act to engage the clutch as soon as tooth alignment with the driving member teeth permits. Misalignment of the teeth of the clutch and the driving member will not interfere with shifting of the rod by the reverse drive shift mechanism and a soft clutch engagement will be had.

An interlock is provided between the shift rod and the pawl to prevent braking of the sun gear and positive drive engagement of the clutch at the same time. The interlock is in the form of a pin 70 slidably mounted in the wall or adapter plate 40 at the rear of casing wall 59 and arranged to register with a recess 71 in the pawl or with a recess 72 in the shift rod. The pin is of such length that when seated in the recess in the rod, the pawl will engage and prevent movement of the pin, and when seated in the recess in the pawl, the rod will engage and prevent movement of the pin. When the recesses align then only can the pin be shifted from one recess to the other.

Spring 50 normally urges the shift rod forwardly so that abutment 51 urges the sleeve clutch 27 out of driving engagement with the positive driving member 26 and thus the positive driving connection is automatically released whenever possible. The interlock arrangement locks the rod to prevent positive two-way drive when the pawl brakes the sun gear for overdrive and locks the pawl out of braking relation when the positive two-way drive is effective. As the shift rod is shifted directly by the reverse drive shift mechanism, it will be impossible to shift into positive two-way drive or to shift into reverse gear in the transmission while the pawl is braking the sun gear for overdrive. Likewise, it will be impossible to shift into positive two-way drive by the cam mechanism while the pawl is braking the sun gear for overdrive.

Figure 6:
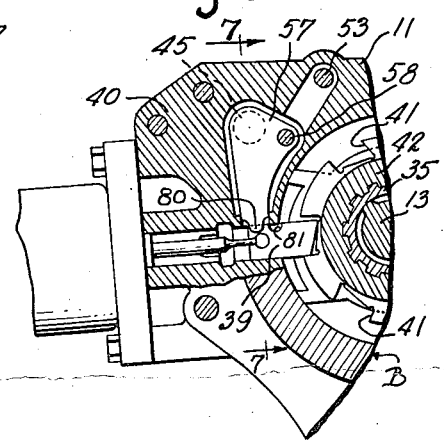
Fig. 6 is a view similar to Figs. 3 and 4, showing a modified form of the invention.
Figure 7:
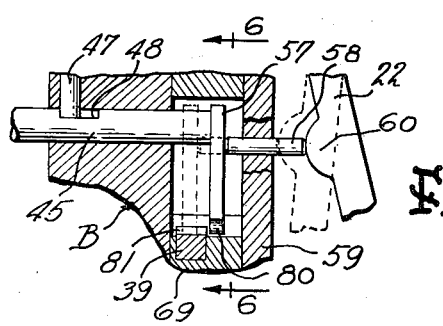
Fig. 7 is a sectional view taken on line 7—7 of Fig. 6.

In Figs. 6 and 7 is shown a modified form of interlock mechanism. In this arrangement the pin 70 employed in Figs. 1 to 5, inclusive, is replaced by an integral part of the shift rod. The shift rod end flange 57 is formed with an interlock extension 80 that is engageable in a recess 81 in the pawl 39 when released from the sun gear and the shift rod is moved rearwardly to establish positive drive. When the pawl is engaged to hold the sun gear, the interlock extension lies forwardly of the pawl thus blocking the extension so that the shift rod can not be moved rearwardly to obtain direct positive drive.

It will be observed that the control arrangement for the two speed mechanism allows spring engagement of the coupling member in establishing direct positive drive while utilizing an interlock that will prevent the establishment of more than one driving speed.

Although the invention has been described in connection with specific embodiments, the principles involved are susceptible of numerous other application which will readily occur to persons skilled in the art. The invention is therefore to be limited only as indicated by the scope of the appended claims.

What I claim is:

1. In a transmission, a drive shaft, mechanism for selectively driving said shaft in opposite directions including reverse drive shift means, a tail shaft, planetary gearing in driven engagement with the drive shaft, a driving member fixed to the drive shaft, means drivingly coupling a portion of the planetary gearing with the tail shaft and shiftable to engage and couple the driving member with the tail shaft through the planetary gearing, means shiftable to brake a portion of the planetary gearing to effect modified drive from the drive shaft to the tail shaft, loaded spring actuator means for shifting the coupling means into and out of engagement with the driving member, a shift rod operable to operate the loaded spring actuator means, a shift member engaging said rod, said shift member being operable by said reverse drive shift means in its movement effecting reverse drive to shift said rod and engage the coupling member with the driving member, and interlock means cooperating with said shiftable planetary brake means and said rod in relation to prevent reverse gear shift and shift of said coupling means to engage said driving member while the planetary gearing portion is braked.

2. In a transmission, a drive shaft, mechanism for selectively driving said shaft in opposite directions including reverse drive shift means, a tail shaft, planetary gearing in driven engagement with the drive shaft, a driving member fixed to the drive shaft, means drivingly coupling a portion of the planetary gearing with the tail shaft and shiftable to engage and couple the driving member with the tail shaft, means shiftable to brake a portion of the planetary gearing to effect modified drive from the drive shaft to the tail shaft through the planetary gearing, a shifter fork engaging the coupling means, guide means engaged by the fork, a shift rod extending through the fork, a spring connection between the rod and the fork, a shift member engaging said rod, said shift member being operable by said reverse drive shift means in its movement effecting reverse drive to shift said rod and engage the coupling means with the driving member through the spring connection with the fork, and interlock means cooperating with said shiftable planetary brake means and said rod in relation to prevent reverse gear shift and shift of said coupling means to engage said driving member while the planetary gearing portion is braked.

3. In a transmission, a drive shaft, mechanism for selectively driving said shaft in opposite direction including reverse drive shift means, a tail shaft, planetary gearing in driven engagement with the drive shaft, a driving member fixed to the drive shaft, means drivingly coupling a portion of the planetary gearing with the tail shaft and shiftable to engage and couple the driving member with the tail shaft, means shiftable to brake a portion of the planetary gearing to effect modified drive from the drive shaft to the tail shaft through the planetary gearing, a fork engaging the coupling means, a shift rod extending through the fork and having an abutment, a coil spring bearing against the rod abutment and the fork, a shift member engaging said rod, said shift member being operable by said reverse drive shift means in its movement effecting reverse drive to shift said rod and engage the coupling means with the driving member through pressure of the abutment against the spring engaging the fork, and interlock means cooperating with said shiftable planetary brake means and said rod in relation to prevent reverse gear shift and shift of said coupling means to engage said driving member while the planetary gearing portion is braked.

4. In a transmission, a drive shaft, mechanism for selectively driving said shaft in opposite directions including reverse drive shift means, a tail shaft, planetary gearing in driven engagement with the drive shaft, a driving member fixed to the drive shaft, a sleeve clutch drivingly coupling a portion of the planetary gearing with the tail shaft and shiftable to engage and couple the driving member with the tail shaft, means shiftable to brake a portion of the planetary gearing to effect modified drive from the drive shaft to the tail shaft through the planetary gearing, a fork engaging the clutch sleeve, a shift rod extending through the fork and having an abutment, a spring between the abutment and the fork, a shift member engaging said rod, said shift member being operable by said reverse drive shift means in its movement effecting reverse drive to shift said rod and engage the coupling means with the driving member through the spring and fork, interlock means cooperating with said shiftable planetary brake means and said rod in relation to prevent reverse gear shift and shift of said coupling means to engage said driving member while the planetary gearing portion is braked, cam means operable to shift said fork to engage the sleeve clutch with the driving member, and spring means opposing movement of the shift rod through operation of the reverse drive shift means.

5. In a transmission, a drive shaft, mechanism for selectively driving said shaft in opposite directions including reverse drive shift means, a tail shaft, planetary gearing in driven engagement with the drive shaft, a driving member fixed to the drive shaft, a clutch sleeve drivingly coupling a portion of the planetary gearing with the tail shaft and shiftable to engage and couple the driving member with the tail shaft, means shiftable to brake a portion of the planetary gearing to effect modified drive from the drive shaft to the tail shaft through the planetary gearing, a fork engaging said clutch sleeve, a shift rod extending through the fork and having an abutment, a spring around the rod engaging the abutment and the fork, a shift member engaging said rod, said shift member being operable by said reverse drive shift means in its movement effecting reverse drive to shift said rod and engage the clutch sleeve with the driving member through the spring pressure created by the abutment against the fork, interlock means cooperating with said shiftable planetary brake means and said rod in relation to prevent reverse gear shift and shift of said coupling means to engage said driving member while the planetary gearing portion is braked, and a spring extending internally of the rod and exerting pressure opposing movement of the rod by the reverse drive shift means.

6. In a transmission, a drive shaft, a tail shaft, planetary gearing in driven engagement with the drive shaft, a driving member fixed to the drive shaft, a shiftable clutch drivingly connecting a portion of the planetary gearing with the tail shaft and shiftable to also drivingly connect the driving member with the tail shaft, means for holding or releasing another portion of the planetary gearing, a shifter fork engaging the clutch and having a looped end, a shift rod projecting through portions of the fork forming the looped end, an abutment on the rod within the looped end of the fork, a coil spring surrounding the rod, one end of said spring engaging the abutment and the other end of the spring engaging a portion of the fork forming the looped end, means operable to shift the rod in a direction whereby the abutment will apply force against the spring and thereby shift the fork to engage the clutch with the driving member, and spring means acting on said rod to normally shift the clutch out of engagement with the driving member through pressure of the abutment against the looped end of the fork.

7. In a transmission, a drive shaft, a tail shaft, planetary gearing in driven engagement with the drive shaft, a driving member fixed to the drive shaft, a shiftable clutch drivingly connecting a portion of the planetary gearing with the tail shaft and shiftable to also drivingly connect the driving member with the tail shaft, means for holding or releasing another portion of the planetary gearing, a shifter fork engaging the clutch and having a looped end, a shift rod extending through the looped end of the fork and having a slot therethrough, a fixed pin extending into the slot in said rod to limit rotational and axial movement of the rod, and means for shifting the rod in an axial direction to shift the clutch into or out of engagement with the driving member.

8. In a transmission, a drive shaft, a tail shaft, planetary gearing in driven engagement with the drive shaft, a driving member fixed to the drive shaft, a shiftable clutch drivingly connecting a portion of the planetary gearing with the tail shaft and shiftable to also drivingly connect the driving member with the tail shaft, means for holding or releasing another portion of the planetary gearing, a shifter fork engaging the clutch, a fixed supporting member on which the clutch is slidably mounted, a shift rod slidable through a portion of the fork, an abutment on the rod, a coil spring surrounding the rod, one end of said spring engaging the abutment and the other end of the spring engaging a portion of the fork, means operable to shift the rod in a direction whereby the abutment will increase the force of the spring against the fork to shift the clutch into engagement with the driving member, and spring means acting on said rod to normally shift the clutch out of engagement with the driving member through pressure of the abutment against a portion of the fork.

FOREST R. McFARLAND.